(12) United States Patent
Nakao (10) Patent No.: US 7,907,636 B2
(45) Date of Patent: *Mar. 15, 2011

(54) RADIO APPARATUS

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 743 days.

This patent is subject to a terminal disclaimer.

(21) Appl. No.: 11/487,963

(22) Filed: Jul. 18, 2006

(65) Prior Publication Data

US 2007/0014227 A1 Jan. 18, 2007

(51) Int. Cl.
*H04B 3/10* (2006.01)

(52) U.S. Cl. ........ 370/491; 370/480; 370/498; 370/500; 370/445; 375/345

(58) Field of Classification Search .................. 370/203, 370/445, 91, 480, 500, 498; 375/345
See application file for complete search history.

(56) References Cited

U.S. PATENT DOCUMENTS

| 2006/0203932 A1* | 9/2006 | Palanki et al. | 375/295 |
| 2007/0081602 A1* | 4/2007 | Tanaka et al. | 375/260 |
| 2007/0140377 A1* | 6/2007 | Murakami et al. | 375/299 |

FOREIGN PATENT DOCUMENTS

| JP | 2006-029352 | | 2/2006 |
| WO | WO2005050885 | * | 6/2005 |

OTHER PUBLICATIONS

Sinem Coleri, Mustafa Ergen, Anuj Puri and Ahmad Bahai, "Channel Estimation Techniques Based on Pilot Arrangement in OFDM Systems", IEEE Transactions on broadcasting, vol. 48, No. 3, pp. 223-229, Sep. 2002.

* cited by examiner

*Primary Examiner* — Huy D Vu
*Assistant Examiner* — Omer Mian
(74) *Attorney, Agent, or Firm* — McDermott Will & Emery LLP (57) ABSTRACT

A modem unit inputs a plurality of combinations, of control signal and data signal, which are to use a plurality of subcarriers. In a plurality of combinations the modem unit adds a first known signal for data signals contained at least in a first combination, and in a plurality of combinations inputted to an input unit it adds second known signals for a second combination and the subsequent combinations, respectively, in anterior positions. The modem unit uses part of a plurality of subcarriers for control signals contained respectively in the second combination and the subsequent combinations, and defines a second known signal in a manner that a part corresponding to the part of a plurality of subcarriers is extracted from the first known signal.

10 Claims, 8 Drawing Sheets

RADIO APPARATUS

BACKGROUND OF THE INVENTION

1. Field of the Invention

The present invention relates to radio apparatus, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The burst signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the packet signal, which is the so-called preamble or training signal. The other one is the known signal, provided for part of carriers in the data area of the packet signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No.3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and packet signals to be transmitted in parallel are set (hereinafter, each of data to be transmitted in parallel in a packet signal is called "stream"). That is, streams up to the maximum number of antennas are set for the communications between the transmitting apparatus and the receiving apparatus so as to improve the data transmission rates.

Moreover, combining this MIMO system with the OFDM modulation scheme results in a higher data transmission rate. For the purpose of enhancing the transmission efficiency in this MIMO system, the data signals to be transmitted respectively in a plurality of packets are aggregated into a single packet. In so doing, the control signals are appended to the respective data signals. In other words, a plurality of combinations of control signals and data signals are contained in the packet signals. It is generally the case that the information amount of control signals is smaller than that of data signals. Here, MIMO is carried out between a plurality of streams to transmit the data signals. On the other hand, the subcarriers to be used respectively by a plurality of streams are so defined as to be varied, and the control signals are divided into streams, respectively, so as to be transmitted.

Under the above circumstances, the weight in the receiving apparatus differs between when the data signal is received and when the control signal is received. In the case where known signals are appended to the header portion of packet signals and the weights are derived, using said known signals, by the receiving apparatus, there is a possibility that the error rate will worsen in the rear combination. Since the control signal contains important information therein, it is required that the control signals be transmitted more reliably than the data signal.

SUMMARY OF THE INVENTION

The present invention has been made in view of the foregoing circumstances and a general purpose thereof is to provide a radio apparatus that prevents the error rate of a control signal from deteriorating when a plurality of combinations of control signal and data signal are transmitted.

In order to solve the above problems, a radio apparatus according to one embodiment of the present invention comprises: an input unit which inputs a plurality of combinations of control signal and data signal wherein the combination uses a plurality of subcarriers; a generation unit which generates a packet signal from the plurality of combinations inputted to the input unit in a manner that a first known signal is added to a data signal at least contained in a first combination among the plurality of combinations inputted to the input unit and a second known signal is added to a second combination and the subsequent combinations, respectively, among the plurality of combinations inputted to the input unit, in an anterior part thereof; and a transmitter which transmits the packet signal generated by the generation unit. The generation unit uses part of a plurality of subcarriers for control signals contained respectively in the second combination and the subsequent combinations, and defines the second known signal in a manner such that part corresponding to the part of a plurality of subcarriers is extracted from the first known signal.

According to this embodiment, the second known signal is appended to the second and the subsequent combinations, so that the degradation in the error rate of a control signal can be prevented.

For the first known signal composed of a plurality of symbols, the generation unit may change subcarriers used in the symbols, respectively, so define a subcarrier used in any of the symbols as to be identical to a subcarrier used in a control signal contained in each of the second and the subsequent combinations, and so define the second known signal as to be identical to part of the first known signal corresponding to the any of the symbols.

The generation unit may include: an interleave unit which performs interleaving of a size defined by a first number of subcarriers on a control signal contained in a first combination and performs interleaving of a size defined by a second number of subcarriers on a data signal among a plurality of combinations inputted by the input unit; and an adding unit which adds an additional signal to a control signal contained in the second combination and the subsequent combinations. The adding unit may add additional signals whose amount corresponds to a difference between the second number of subcarriers and the first number of subcarriers.

The additional signal inserted by the adding unit may be a dummy signal. The additional signal inserted by the adding unit may be a signal for parity check. The additional signal inserted by the adding unit may be a known signal.

The generation unit may include: an adding unit which adds an additional signal to a control signal contained in the second combination and the subsequent combinations among a plurality of combinations inputted by the input unit; and an interleave unit which performs interleaving of a size defined by a first number of subcarriers on a control signal contained in a first combination and performs interleaving of a size defined by a second number of subcarriers on the remaining signals among a plurality of combinations in which the additional signal has been added by the adding unit. The adding unit may add additional signals whose amount corresponds to a difference between the second number of subcarriers and the first number of subcarriers.

The additional signal inserted by the adding unit may be a signal for cyclic redundancy check (CRC). The additional signal inserted by the adding unit may be a known signal.

Another embodiment of the present invention relates also to a radio apparatus. This apparatus comprises: a receiver which receives a plurality of combinations of control signal and data signal wherein the combination uses a plurality of subcarriers; and a demodulation unit which demodulates a packet signal from the plurality of combinations received by the receiver in a manner that while using a first known signal the demodulation is performed on a data signal at least contained in a first combination among the plurality of combinations received by the receiver and while using a second known signal placed in an anterior part the demodulation is performed on a second combination and the subsequent combinations, respectively, among the plurality of combinations received by the receiver. In the receiver, the control signals contained respectively in the second combination and the subsequent combinations use part of a plurality of subcarriers and the second known signal is defined in a manner such that part corresponding to the part of a plurality of subcarriers is extracted from the first known signal.

According to this embodiment, the second known signal is appended to the second and the subsequent combinations and therefore the degradation in the error rate of a control signal can be prevented.

The demodulation unit may include: an excluding unit which excludes an additional signal from the control signal contained in the second combination and the subsequent combination among the plurality of combinations received by the receiver; and a deinterleave unit which performs deinterleaving of a size defined by a first number of subcarriers on a control signal and performs deinterleaving of a size defined by a second number of subcarriers on a data signal in a plurality of combinations in which the additional signal has been excluded by the excluding unit. The excluding unit may exclude additional signals whose amount corresponds to a difference between the second number of subcarriers and the first number of subcarriers.

The modulation unit may include: a deinterleave unit which performs deinterleaving of a size defined by a first number of subcarriers on a control signal contained in a first combination and performs deinterleaving of a size defined by a second number of subcarriers on the remaining signals in the plurality of combinations received by the receiver; and an excluding unit which excludes an additional signal from the control signal contained in the second combination and the subsequent combinations among a plurality of combinations deinterleaved by the deinterleave unit. The excluding unit may exclude additional signals whose amount corresponds to a difference between the second number of subcarriers and the first number of subcarriers.

Still another embodiment of the present invention relates also to a radio apparatus. This apparatus comprises: an input unit which inputs a plurality of combinations of control signal and data signal wherein the combination uses a plurality of subcarriers; a generation unit which generates a packet signal from the plurality of combinations inputted to the input unit in a manner that a first known signal is added to a data signal at least contained in a first combination among the plurality of combinations inputted to the input unit and a second known signal is added to a second combination and the subsequent combinations, respectively, among the plurality of combinations inputted to the input unit, in an anterior part thereof; and a transmitter which transmits the packet signal generated by the generation unit. The generation unit may define the second known signal in such a manner as to extract part of the first known signal.

According to this embodiment, the length of a known signal appended to the second and the subsequent combinations is equivalent to part of the length of a known signal appended to the first combination. Hence, the degradation in the error rate of a control signal can be prevented.

Data may be composed of a plurality of streams. A known signal may be composed of a plurality of streams. A control signal may be composed of a plurality of streams.

It is to be noted that any arbitrary combination of the above-described structural components and the expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

An outline of the present invention will be given before a detailed description thereof. The Embodiments of the present invention relate to a MIMO system comprised of at least two radio apparatuses. One of the radio apparatuses corresponds to a transmitting apparatus whereas the other thereof corresponds to a receiving apparatus. The transmitting apparatus generates one packet signal in such a manner as to contain a plurality of combinations of control signal and data signal. Note that one packet signal is composed of a plurality of streams. As mentioned earlier, if the weight at the time of receiving a control signal differ from the weight at the time of receiving a data signal, the receiving apparatus must derive the weights for them, respectively. It is desired that the degradation of error rates for the control signals contained in the combination placed in an anterior part of the packet signal be prevented. In the present embodiment, the following processing is executed to solve the above problems.

The transmitting apparatus appends a known signal for use in channel estimation (hereinafter referred to as "first known signal") to a header portion of a packet signal, and appends a known signal for channel estimation (hereinafter referred to as "second known signal") to front portions of the second and the subsequent combinations, respectively. Here, the first known signal is composed of a plurality of symbols, and a subcarrier used in any of the plurality of symbols coincides with a subcarrier used in the control signal. The second known signal is so defined as to be identical to part of the first known signal corresponding to any of the plurality of symbols. When the receiving apparatus receives a packet signal, the receiving apparatus receives data contained respectively in a plurality of combinations while using the weights derived from the first known signal. On the other hand, the receiving apparatus control signal contained in the second and the subsequent combinations, respectively, while using the weights derived from the second known signal. In this manner, the weights at the time of receiving the control signals are derived based on the second known signal which has been assigned immediately prior thereto, so that the degradation of error rates for the control signals assigned to a posterior part of the packet signal can be prevented. Since the second known signal is defined as part of the first known signal, the drop in transmission efficiency can be restricted.

Figure 1:
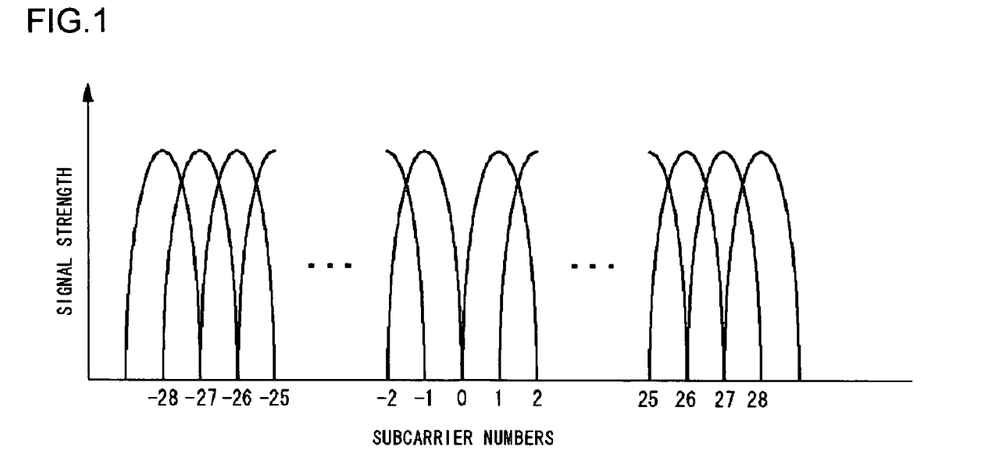
FIG. 1 illustrates a spectrum of a multicarrier signal according to an embodiment of the present invention.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, in a legacy system, 52 subcarriers, namely, subcarrier numbers "−26" to "26" are defined. One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to 1/2, 3/4 and so forth. The number of data to be transmitted in parallel is set variably. The data are transmitted as packet signals and each of packet signals to be transmitted in parallel is called "stream" herein. As a result thereof, since the mode of modulation scheme and the values of coding rate and the number of streams are set variably, the data rate is also set variably. It is to be noted that the "data rates" may be determined by arbitrary combination of these factors or by one of them.

Figure 2:
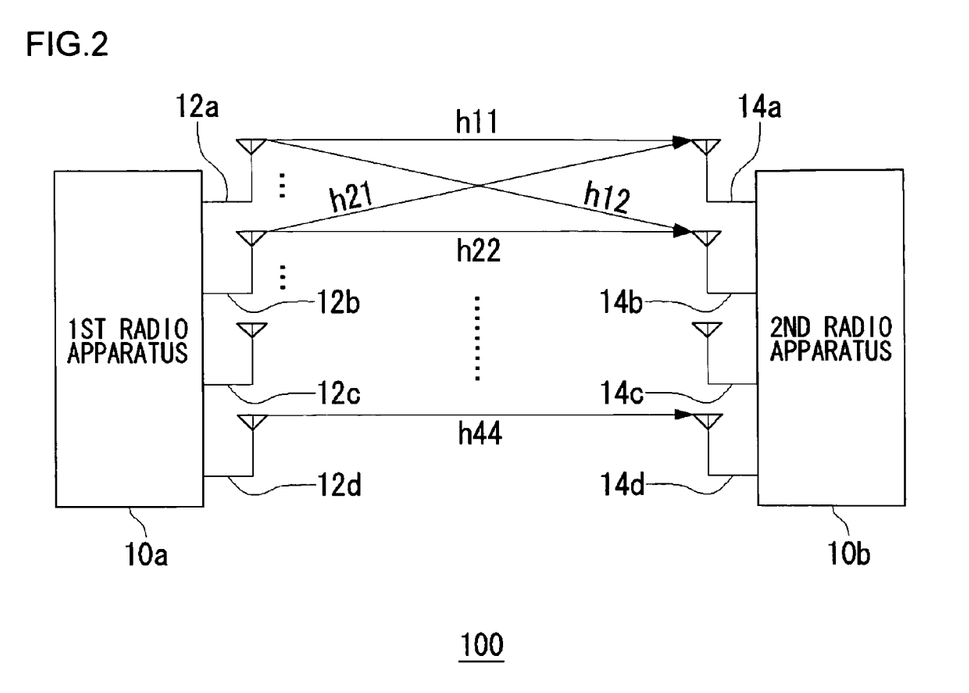
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically called "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a transmitting apparatus, whereas the second radio apparatus 10b corresponds to a receiving apparatus.

An outline of a MIMO system will be given before a description of a structure of the communication system 100. Assume herein that data are being transmitted from the first radio apparatus 10a to the second radio apparatus 10b. The first radio apparatus 10a transmits respectively the data of a plurality of streams from the first antenna 12a to the fourth antenna 12d, respectively. As a result, the data rate becomes higher. The second radio apparatus 10b receives the data of a plurality of streams by the first antenna 14a to the fourth antenna 14d. The second radio apparatus 10b separates the received signals by adaptive array signal processing and demodulates independently the data of a plurality of streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between from the first antenna 12a to the second antenna 14b by $h_{12}$, that between the second antenna 12b and the first antenna 14a by $h_{21}$, that between from the second antenna 12b to the second antenna 14b by $h_{22}$, and that between from the fourth antenna 12d to the fourth antenna 14d by $h_{44}$. For the clarity of illustration, the other channels are omitted in FIG. 2.

Figure 3:
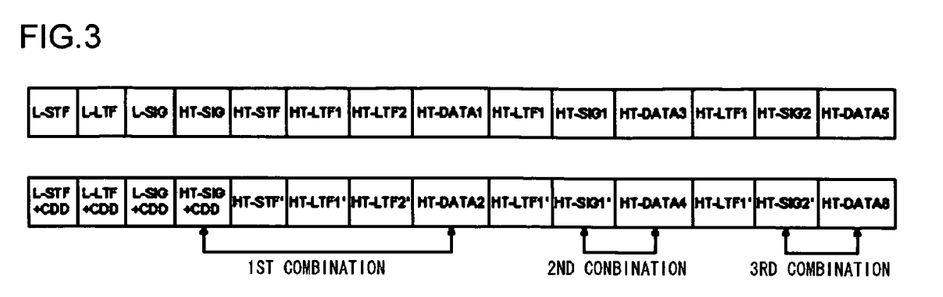
FIG. 3 illustrates packet formats in the communication system shown in FIG. 2.

FIG. 3 illustrates packet formats in a communication system 100. For the simplicity of explanation, it is assumed here that the number of streams contained in the packet formats is "2". The stream transmitted from the first antenna 12a is shown in the top row whereas the stream transmitted from the second antenna 12b is shown in the bottom row. In the top row of FIG. 3, "L-STF", "L-LTF", "L-SIG" and "HT-SIG" correspond to a known signal for timing estimation, a known signal for channel estimation, a control signal compatible with a legacy system, and a control signal compatible with a MIMO system, respectively. In the bottom row of FIG. 3, "L-STF+CDD", "L-LTF+CDD", "L-SIG+CDD" and "HT-SIG+CDD" correspond to the results obtained when CDD (Cyclic Delay Diversity) is implemented to "L-STF", "L-LTF", "L-SIG" and "HT-SIG", respectively. The CDD is a processing where in a predetermined interval a time-domain waveform is shifted, by a shift amount, in a posterior direction and then the waveform pushed out of the rearmost part in the predetermined interval is assigned cyclically to a header portion of the predetermined interval. That is, "L-STF+CDD" is such that "L-STF" has undergone the cyclic timing shifting.

"HT-STF" and "HT-STF'" correspond to known signals, for timing estimation, compatible with a MIMO system, and they are so defined as to use different subcarriers from each other. The both symbols, namely, "HT-STF" and "HT-STF'" are so defined as to use different subcarriers from each other. For example, "HT-STF" uses subcarriers whose subcarrier number is odd, whereas "HT-STF'" uses those whose subcarrier number is even. "HT-LTF1", "HT-LTF1'", "HT-LTF2" and "HT-LTF2'" correspond to known signals, for channel estimation, compatible with a MIMO system. Here, "HT-LTF1" and "HT-LTF1'" are so defined as to use different subcariers from each other, similarly to "HT-STF" and "HT-STF'". The same applies to "HT-LTF2" and "HT-LTF2'". On the other hand, "HT-LTF2" is so defined as to use the subcarriers that have not been used in "HT-LTF1".

"HT-DATA1" and "HT-DATA2" are data signals. The control signals for "HT-DATA1" and "HT-DATA2" correspond to "HT-SIG" and "HT-SIG+CDD", respectively. Accordingly, a set of "HT-SIG", "HT-SIG+CDD", "HT-DATA1" and "HT-DATA2" is called a "first combination".

"HT-SIG1" and "HT-SIG1'" are control signals for "HT-DATA3" and "HT-DATA4" which are assigned posterior to the "HT-SIG1" and "HT-SIG1'", respectively. "HT-SIG1" and "HT-SIG1'" are so defined as to use subcarriers different from each other, similarly to "HT-STF" and "HT-STF'". Note that the subcarriers used for "HT-SIG1" are the same as those used for "HT-LTF1", and the subcarriers used for "HT-SIG1'" are the same as those used for "HT-SIG1'". Here, "HT-LTF1" and "HT-LTF1'" are assigned anterior to "HT-SIG1" and "HT-SIG1 '". "HT-DATA3" and "HT-DATA4" are data signals. A set of "HT-SIG1" and "HT-SIG1'", "HT-DATA3" and "HT-DATA4" is called a "second combination".

The same holds for "HT-SIG2" and "HT-SIG2'", "HT-DATA5" and "HT-DATA6", and a set of these is called a "third combination". "HT-LTF1" and "HT-LTF1'" are assigned anterior to "HT-SIG2" and "HT-SIG2'"

For the above packet formats, the receiving apparatus performs receiving processing on "HT-SIG" contained in the first combination, by use of the weights derived from "L-LTS". The receiving apparatus performs receiving processing on "HT-DATA1" and so forth, by use of the weights derived from "HT-LFT1", "HT-LFT2", "HT-LFT1'" and "HT-LFT2'". The receiving apparatus performs receiving processing on "HT-SIG1" and "HT-SIG1'", by use of the weights derived from "HT-LFT1" and "HT-LFT1'" immediately prior thereto. The receiving apparatus performs receiving processing on "HT-SIG2" and "HT-SIG2'", by use of the weights derived from "HT-LTF1" and "HT-LFT1'" immediately prior thereto.

The portions from the beginning up to "HT-SIG" and "HT-SIG+CDD" use "52" subcarriers in the same way as in a legacy system (hereinafter this number will be referred to as "first number of subcarriers"). Of "52" subacarriers, "4" subcarriers correspond to the pilot signals. On the other hand, the portions corresponding to "HT-STF" and "HT-STF'" use "24" subcarriers in the total of a plurality of streams. The portions corresponding to "HT-LFT1", "HT-LFT1'", "HT-SIG1", "HT-SIG1'" and so forth use "56" subcarriers in the total of a plurality of streams (hereinafter this number will be referred to as "second number of subcarriers"). The portions corresponding to "HT-DATA1", "HT-DATA2" and so forth use "56" subcarriers.

In the receiving apparatus, "HT-SIG" and the like are demodulated based on "L-LTF", as described earlier. The both use the same number of carriers, namely "52", and a processing for adjusting to the power at a posterior part of "56" subcarriers is carried out. On the other hand, "HT-SIG1" and the like are demodulated based on "HT-LFT1" and the like immediately prior thereto, as described above. Note that the amount of data such as "HT-SIG1" is the same as the amount of data such as "HT-SIG1". Accordingly, if "HT-SIG1" and the like use "52" subcarriers in the same way as in "HT-SIG" and the like, the number of subacarriers used does not agree with the number of subcarriers, namely, "56", used in "HT-LFT1" and the like, so that the powers at the both fields do not coincide. Thus, according to the present invention, the number of subcarriers used in "HT-SIG" and the like is extended to "56". In so doing, an "additional signal is appended to the "control signal". Hereinafter, a control signal to which an additional signal is appended or control signals to which additional signals are appended will be referred to as a "control signal with an additional signal" or "control signals with their respective additional signals", respectively.

The above described packet formats are structured in the light of following grounds. The strong error resistance is required of "HT-SIG1" and the like and therefore the execution of spatial multiplexing as with "DATA1" and the like is not desirable. Hence, the same subcarriers as with "HT-LTF1" and "HT-LFT1'" are used so as to make the error resistance of "HT-SIG1" stronger. As a result, the weights for "DATA1" and the like will differ from the weights for "HT-SIG1" and the like. Since "DATA1" and the like are received continuously to some extent, the receiving suited to the change in channel characteristics can be done by referring to the pilot signals in "DATA1" and the like while using "HT-LTF1", "HT-LFT2", "HT-LTF1'" and "HT-LFT2'".

On the other hand, "HT-SIG1" and the like are of discrete nature, and there is little chance of updating the receiving weights for "HT-SIG1" and the like. Hence, it is difficult to perform the receiving operation suited to the change in channel characteristics. Thus, it is preferred that "HT-LTF1" and "HT-LFT1'" be inserted immediately before "HT-SIG1" and the like. Since "HT-LTF1" and "HT-LTF1'" are part of "HT-LTF1", "HT-LFT2", "HT-LTF1'" and "HT-LFT2'", the increased cost of the radio apparatus 10 can be restricted.

For the above-described "HT-SIG", "HT-SIG1" and so forth, there has been a demand that the same interleave unit and the same deinterleave unit are installed in the radio apparatus 10 for the simplicity of processing and the processing is performed on "HT-SIGs" to which the same information bits have been arranged. Normally, since the number of subcarriers for "HT-SIG1" and the like is adjusted to the number of subcarriers for "HT-SIG", that of "HT-SIG1" and the like becomes "52". Thus, the power fluctuation occurs in "HT-SIG1" and the like. According to the present invention, the power variation can be compensated while meeting the above demand by appending the additional signals.

Figure 4:
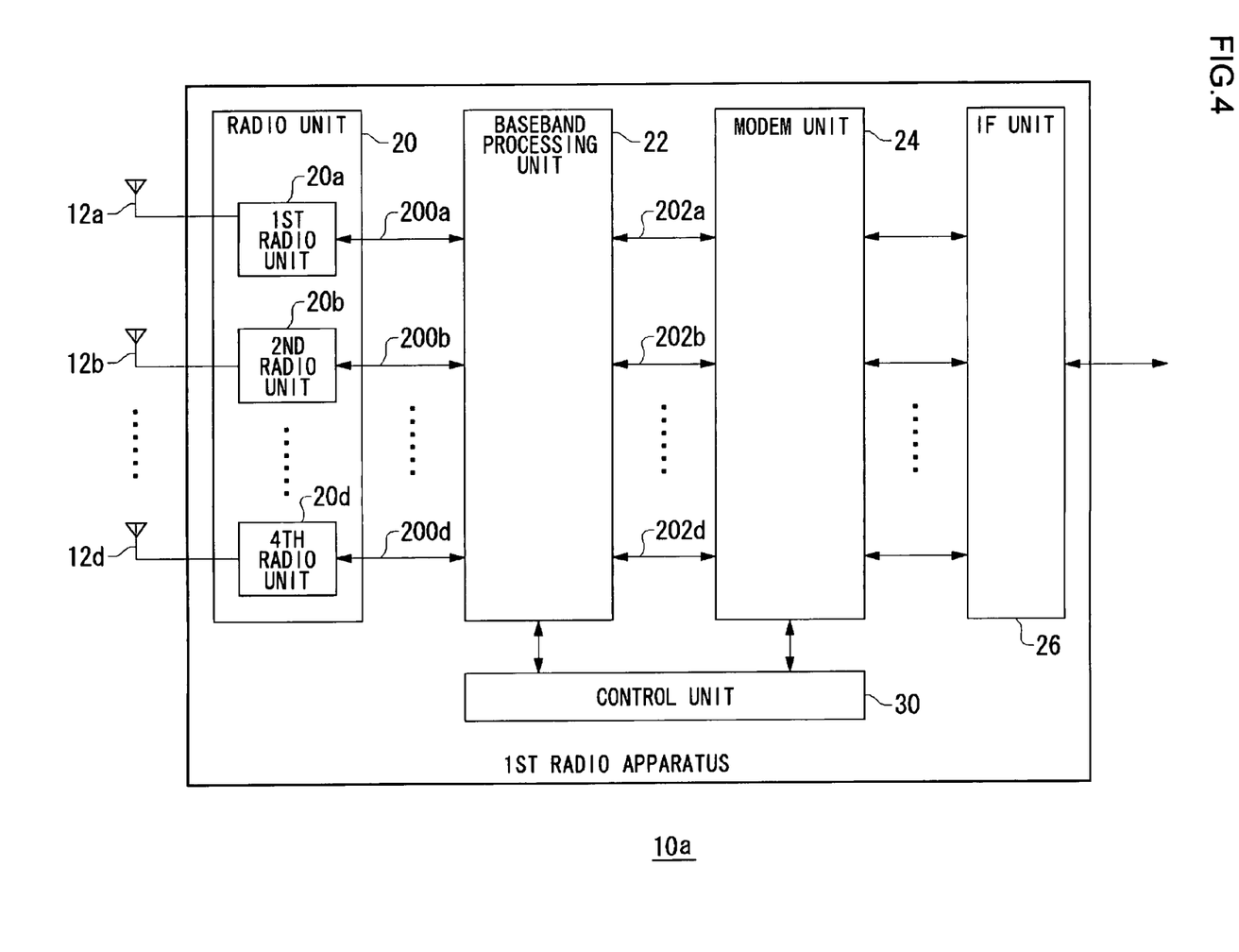
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". The second radio apparatus 10b has a structure similar to that of the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC unit and an A-D conversion unit are also included.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (power amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. The detailed description of adaptive array signal processing will be given alter. The baseband processing unit 22 outputs the result of adaptive array signal processing as the frequency-domain signals 202. One frequency-domain signal 202 corresponds to data contained in each of a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively with a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
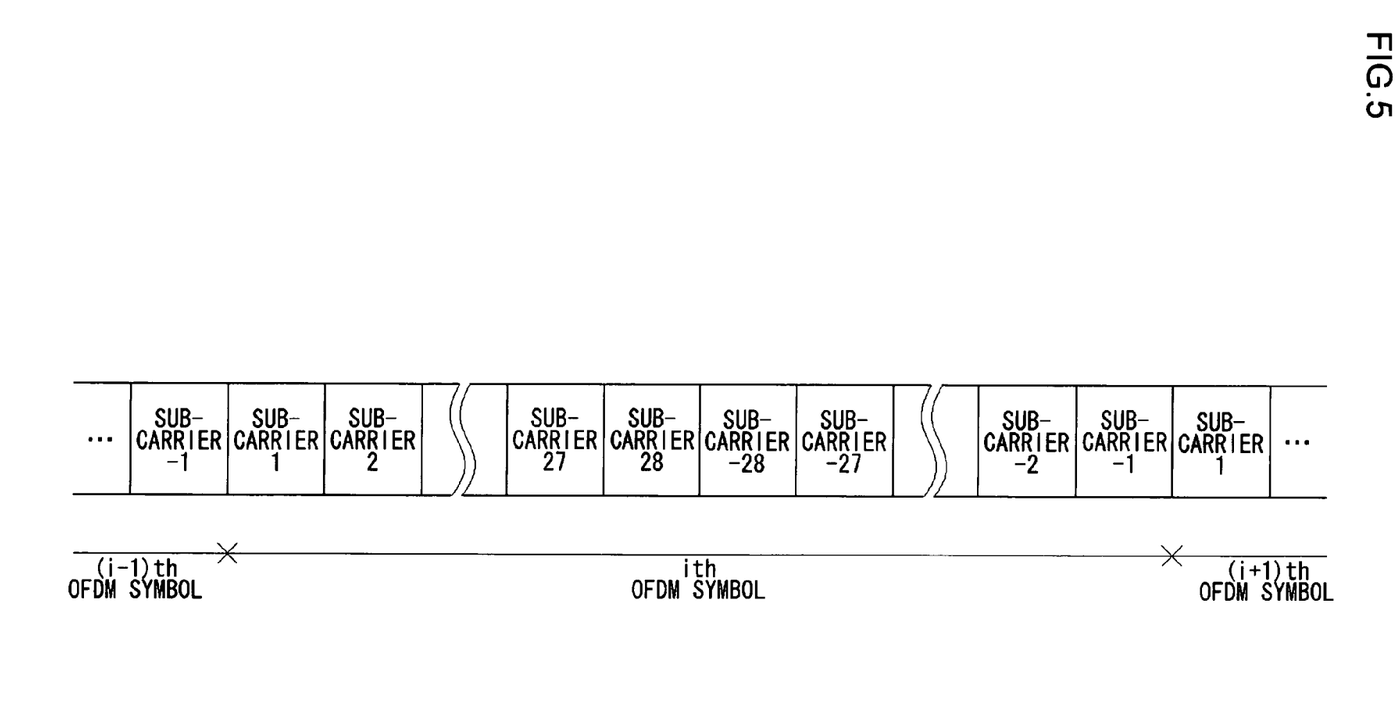
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarrier components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. It is to be noted here that in the portions such as "L-SIG" shown in FIG. 3 a combination of from the subcarrier number "−26" to the subcarrier number "−26" is used for each "OFDM symbol".

Now refer back to FIG. 4. To produce the packet formats corresponding to FIG. 3, the baseband processing unit 22 carries out CDD. CDD is expressed as a matrix C in the following Equation (1).

$$C(\lambda)=\mathrm{diag}(1, \exp(-j2\pi\lambda\delta/N\mathrm{out}),\Lambda, \exp(-j2\pi\lambda\delta(N\mathrm{out}-1)/N\mathrm{out}) \quad (1)$$

where $\delta$ indicates a shift amount and $\lambda$ a subcarrier number. The multiplication of the matrix C by a stream is done on a subcarrier-by-subcarrier basis. That is, the baseband processing unit 22 carries out a cyclic time shifting within the STF and so forth per stream. The shift amount is set to a different value for each stream.

As a receiving processing, the modem unit 24 demodulates and deinterleaves the frequency-domain signal 202 outputted from the baseband processing unit 22. The demodulation is carried out per subcarrier. The modem unit 24 outputs the demodulated signal to the IF unit 26. As a transmission processing, the modem unit 24 carries out interleaving and modulation. In so doing, the modem unit 24 generates a control signal with an additional signal by appending an additional signal to a control signal. The modem unit 24 outputs the modulated signal to the baseband processing unit 22 as a frequency-domain signal 202. When the transmission processing is carried out, the modulation scheme is specified by the control unit 30.

As a receiving processing, the IF unit 26 combines signals outputted from a plurality of modem units 24 and then forms one data stream. The IF unit 26 decodes the one data stream. The IF unit 26 outputs the decoded data stream. As a transmission processing, the IF unit 26 inputs one data stream, then codes it and, thereafter, separates the coded data stream. Then the IF unit 26 outputs the thus separated data to the plurality of modem units 24. When the transmission processing is carried out, the coding rate is specified by the control unit 30.

The control unit 30 controls the timing and the like of the first radio apparatus 10a. The control unit 30 controls the modem unit 24 and the like so that the packet signals to be transmitted form the packet formats as shown in FIG. 3. That is, the control unit 30 appends "HT-LTF1", "HT-LTF2" or the like to the data signals contained in at least the first combination among a plurality of combinations, and appends "HT-LTF" or the like to anterior parts of the second and the subsequent combinations, respectively, among a plurality of combinations. Here, as described earlier, part of a plurality of subcarriers are used for "HT-SIG1" and the like contained in the second and the subsequent combinations, respectively. And "HT-LTF1" and the like for the second and the subsequent combinations, respectively, are defined in a manner such that part corresponding to said part of a plurality of subcarriers is extracted from "HT-LTF1" and the like.

"HT-LTF1", "HT-LTF2" and the like are each formed by a plurality of symbols. The subcarrier used for each symbol is changed and defined so that the subcarrier used for any of symbols is identical to the subcarrier used for "HT-SIG" and the like contained in the second and the subsequent combinations, respectively. Further, "HT-LTF1" for "HT-SIG1" is so defined as to be identical to "HT-LTF1" in "HT-LTF1" and "HT-LTF2" and.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 6:
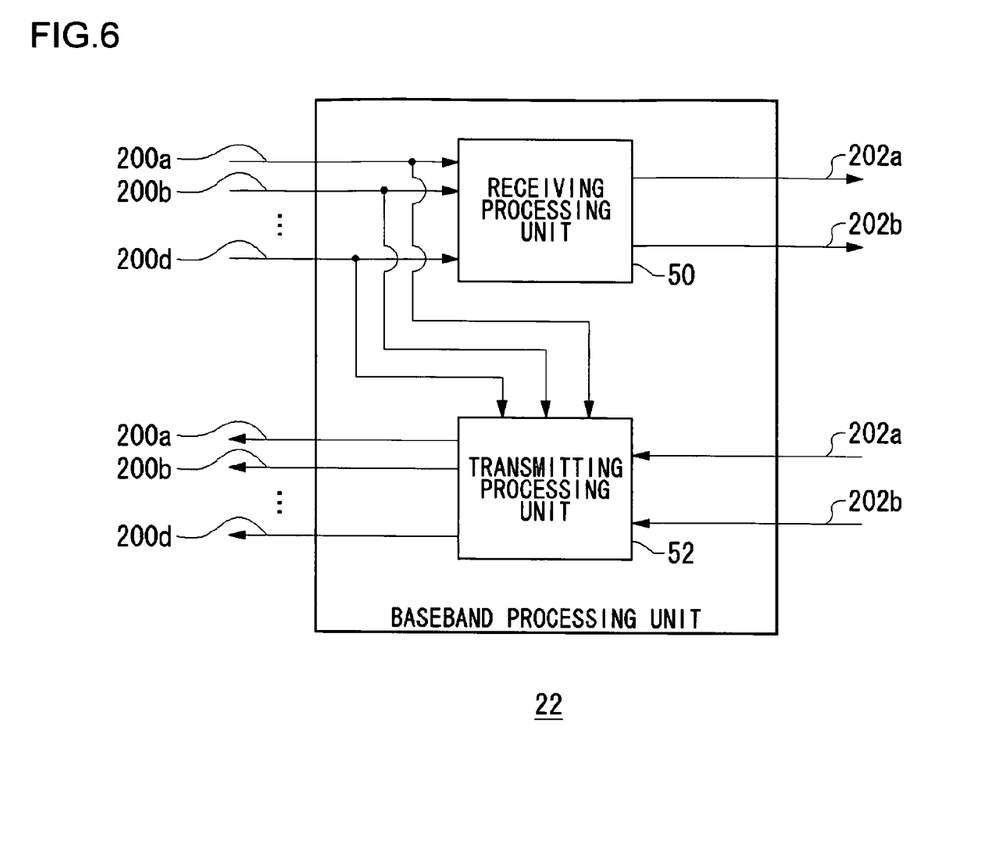
FIG. 6 illustrates a structure of a baseband processing unit shown in FIG. 4.

FIG. 6 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives receiving weight vectors. Then the receiving processing unit 50 outputs the result of array synthesis as the frequency-domain signal 202.

A processing of receiving processing unit 50 will now be described in a specific manner. The receiving processing unit 50 inputs a plurality of time-domain signals 200 and then performs Fourier transform on them, respectively, so as to derive frequency-domain signals. As described earlier, a frequency-domain signal is such that signals corresponding to subcarriers are arranged serially in the order of subcarrier numbers. The receiving processing unit 50 weights the frequency-domain signals with receiving weight vectors, and a plurality of weighted signals are added up. Since the frequency-domain signal is composed of a plurality of subcarriers, the above processing is also executed on a subcarrier-by-subcarrier basis. As a result, the signals summed up are also arranged serially, as shown in FIG. 5, in the order of subcarrier numbers. The signals summed up are the aforementioned frequency-domain signals 202.

Here, the receiving processing unit 50 computes plural kinds of receiving weight vectors. A first kind of receiving weight vector is a receiving weight vector to receive HT-SIG and the like, and is derived from L-LTF and the like. In this case, the receiving processing unit 50 estimates a channel characteristic from L-LTF and the like, and derives a receiving weight vector by calculating the reciprocal of the estimated channel characteristic. A second kind of receiving weight vector is a receiving weight vector to receive HT-DATA1 and the like and is derived from HT-LTF1, HT-LTF1', HT-LTF2, HT-LTF2' and the like. In this case, the receiving processing unit 50 estimates a channel characteristic from HT-LTF1, HT-LTF1', HT-LTF2 and HT-LTF2'. Furthermore, based on the estimated channel characteristic, the receiving processing unit 50 derives a receiving weight vector with which the interference among a plurality of streams gets small.

A third kind of receiving weight vector is a receiving weight vector to receive HT-SIG1, HT-SIG1' and the like and is derived from HT-LTF1 and HT-LTF1' placed immediately prior thereto. In this case, the receiving processing unit 50 estimates a channel characteristic from the HT-LTF1 and HT-LTF1' immediately prior thereto and derives a receiving weight vector by calculating the reciprocal of the estimated channel characteristic. A known technique may be used to derive the above receiving weight vectors. Using such plural kinds of receiving weight vectors as above, the receiving processing unit 50 carries out array synthesis. Under such a condition, the modem unit 24 provided at a subsequent stage carries out demodulation using the pilot signals.

The receiving processing unit 50 estimates channel characteristics by use of correlation processing. If a frequency-domain signal corresponding to the first time-domain signal 200*a* is denoted by $x_1(t)$, a frequency-domain signal corresponding to the second time-domain signal 200*b* by $x_2(t)$, a reference signal in the first stream by $S_1(t)$ and a reference signal in the second stream by $S_2(t)$, then $x_1(t)$ and $x_2(t)$ will be expressed by the following Equation (2):

$$x_1(t)=h_{11}S_1(t)+h_{21}S_2(t)$$

$$x_2(t)=h_{12}S_1(t)+h_{22}S_2(t) \qquad (2)$$

The noise is ignored here. A first correlation matrix $R_1$, with E as an ensemble average, is expressed by the following Equation (3):

$$R_1 = \begin{bmatrix} E[x_1 S_1^*] & E[x_1 S_2^*] \\ E[x_2 S_1^*] & E[x_2 S_2^*] \end{bmatrix} \qquad (3)$$

A second correlation matrix $R_2$ among the reference signals is given by the following Equation (4).

$$R_2 = \begin{bmatrix} E[S_1 S_1^*] & E[S_1 S_2^*] \\ E[S_2 S_1^*] & E[S_2 S_2^*] \end{bmatrix} \qquad (4)$$

Finally, the first correlation matrix $R_1$ is multiplied by the inverse matrix of the second correlation matrix $R_2$ so as to derive a receiving response vector, which is expressed by the following Equation (5).

$$\begin{bmatrix} h_{11} & h_{21} \\ h_{12} & h_{22} \end{bmatrix} = R_1 R_2^{-1} \qquad (5)$$

Then the receiving processing unit 50 computes a receiving weight vector from the channel characteristics.

The transmitting processing unit 52 executes a part, corresponding to a transmission operation, of operations by the baseband processing unit 22. The transmitting processing unit 52 may perform beamforming or eigenmode transmission. Any known technique may be used for these and therefore the description thereof is omitted here.

Figure 7:
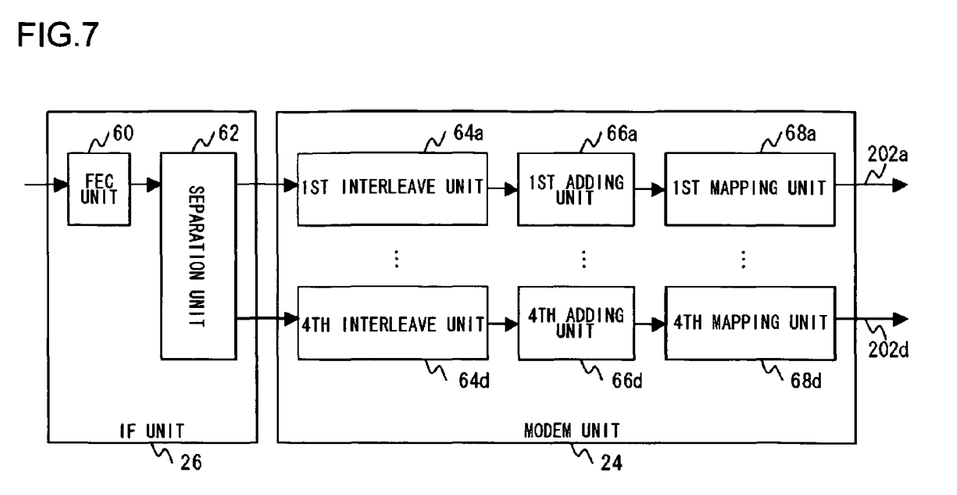
FIG. 7 illustrates a structure of IF unit and modulation unit shown in FIG. 4.

FIG. 7 illustrates a structure of IF unit 26 and modulation unit 24. Shown here is a portion concerning the transmission function in the IF unit 26 and the modulation unit 24. The IF unit 26 includes an FEC (Forward Error-Correcting) unit 60 and a separation unit 62. The modulation unit 24 includes a first interleave unit 64*a* . . . and a fourth interleave unit 64*d*, which are generically referred to as "interleave unit 64", a first adding unit 66*a* . . . and a fourth adding unit 66*d*, which are generically referred to as "adding unit 66", and a first mapping unit 68*a* . . . and a fourth mapping unit 68*d*, which are generically referred to as "mapping unit 68".

A plurality of combinations of control signal and data signal, which are to use a plurality of subcarriers, are inputted to the FEC unit 60. The combinations meant here are equal to the "first combination" to the "third combination" as shown in FIG. 3. The control signal corresponds to "HT-SIG", "HT-SIG1" and the like in FIG. 3. The FEC unit 60 performs coding on each of the plurality of combinations. Note that the coding rate may be set for the control signal and the data signal independently of each other.

The separation unit 62 partitions and separates a signal inputted from the FEC unit 60 into a plurality of streams. The interleave unit 64 carries out an interleaving of a size defined by the first number of subcarriers, namely, 48, on the control signal, and carries out an interleaving of a size defined by the second number of subcarriers, namely, 52, on the data signal. Here, the amount of data contained in the size defined by the number of subcarriers "52" is changed by the modulation scheme or the like used by the modem unit 24. It is assumed that the interleaving pattern is predetermined.

The adding unit 66 adds additional signals to control signals contained in the second and subsequent combinations of the plurality of combinations interleaved by the interleaving unit 64. As a result, control signals with their respective additional signals are generated. Here the control signals contained in the second and subsequent combinations correspond to "HT-SIG1", "HT-SIG1'", "HT-SIG2" and "HT-SIG2'" shown in FIG. 3. It is to be noted that the amount of additional signal to be added by the adding unit 66 is determined by the difference of the second number of subcarriers from the first number of subcarriers. In other words, the amount of additional signal is determined by the difference "4" between the second number of subcarriers and the first number of subcarriers and the modulation scheme. As a result of the processing as described above, the number of subcarriers used by control signals with their respective additional signals becomes the same as the number of subcarriers used by the data signals. It is to be understood here that the additional signal is a dummy signal.

The mapping unit 68 performs mappings of BPSK, QPSK, 16-QAM and 64-QAM on the signals from the adding unit 66.

Mapping, which is a known technology, is not explained here. The mapping unit 68 outputs a mapped signal as a frequency-domain signal 202. The insertion of known signals, such as "L-STF" as shown in FIG. 3, or the insertion of pilot signals is done by the modem unit 24.

On the other hand, the receiving function for receiving the packet signals generated as described above performs operation opposite to that explained above. That is, the modem unit 24 receives an input of frequency-domain signals 202. The frequency domain signal 202, which is a combination of control signal and data signal, is equal to a combination using a plurality of subcarriers. Here the control signals contained in the second and subsequent combinations correspond to control signals with their respective additional signals. The excluding unit (not shown) in the modem unit 24 excludes additional signals from the control signals with their respective additional signals contained in the second and subsequent combinations out of a plurality of combinations. In other words, the excluding unit outputs control signals and data signals by excluding the dummy signals therefrom. Note that the excluding unit excludes additional signals according to the difference between the second number of subcarriers and the first number of subcarriers.

A deinterleave unit (not shown) in the modem unit 24 performs a deinterleaving of a size defined by the first number of subcarriers, namely, "48", on the control signal, of the plurality of combinations with the additional signals excluded, and performs a deinterleaving of a size defined by the second number of subcarriers, namely, "52", on the data signal.

In the description thus far, an additional signal is added to an interleaved control signal. In this condition, the number of subcarriers used for "HT-LTS1" and the like is equal to the number of subcarriers used for a control signal with additional signal. In other words, the variation in the number of subcarriers and the variation in the signal strength of packet signals are subject to restriction. On the other hand, the size of interleaving, when based on the number of subcarriers, is different between the control signal with an additional signal and the data signal. As a result, a switching in the size of interleaving is done between the two. A modification to be described later aims to restrict the change in size to be used in the interleaving.

Figure 8:
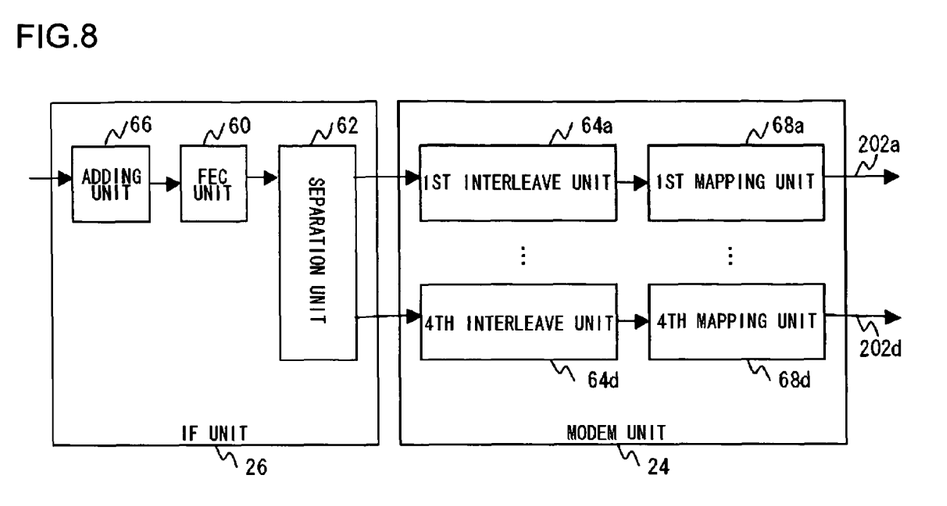
FIG. 8 illustrates another structure of IF unit and modulation unit shown in FIG. 4.

FIG. 8 illustrates another structure of IF unit 26 and modulation unit 24. Shown here is a portion concerning the transmission function in the IF unit 26 and the modulation unit 24. The IF unit 26 includes an adding unit 66, an FEC (Forward Error-Correcting) unit 60 and a separation unit 62. The modulation unit 24 includes a first interleave unit 64*a* . . . and a fourth interleave unit 64*d*, which are generically referred to as "interleave unit 64", and a first mapping unit 68*a* . . . and a fourth mapping unit 68*d*, which are generically referred to as "mapping unit 68". The components having the function equivalent to those in FIG. 7 are given the same reference numerals and therefore their repeated explanation will be omitted as appropriate. Compared with the above structure, the arrangement of the adding unit 66 differs from that in FIG. 7.

A plurality of combinations, of control signal and data signals, which are to use a plurality of subcarriers are inputted to the adding unit 66. The adding unit 66 appends additional signals to the second combination and the subsequent combinations in a plurality of combinations. Accordingly, control signals with their respective additional signals are produced. Here, the amount of additional signals appended by the adding unit 66 is determined by the adding unit according to the difference between the first number of subcarriers and the second number of subcarriers. It is assumed herein that the additional signals are for use with CRC (Cyclic Redundancy Check). The signals for CRC are generated by the FEC unit 60. As a result, the bit number used for CRC increases and therefore the data error characteristics improves. The additional signal may be a signal for use with parity check.

The interleave unit 64 carries out an interleaving of a size defined by the first number of subcarriers on the control signal contained in the first combination, and carries out an interleaving of a size defined by the second number of subcarriers on the remaining signals. That is, the number of interleave size switching can be reduced.

On the other hand, the receiving function of receiving the packet signals thus generated executes an operation opposite to the operation in the above description. That is, the modem unit 24 inputs the frequency-domain signals 202. The frequency-domain signal corresponds to a combination, of control signal and data signal, which uses a plurality of subcarriers. Here, control signals contained in the second combination and the subsequent combinations are control signals with their respective additional signals.

A deinterlieave unit (not shown) in the modem unit 24 performs a deinterleaving of a size defined by the first number of subcarriers on control signals contained in the first combination among a plurality of combinations, and performs a deinterleaving of a size defined by the second number of subcarriers on the remaining signals.

The excluding unit (not shown) in the modem unit 24 excludes additional signals from the control signals with their respective additional signals contained in the second and subsequent combinations out of a plurality of combinations. That is, the excluding unit outputs control signals and data signals by excluding the signals for CRC. Note that the excluding unit excludes additional signals according to the difference between the second number of subcarriers and the first number of subcarriers. The IF unit 26 executes the detection by CRC.

According to the embodiments of the present invention, a known signal is appended to a part immediately before a control signal contained in the second and the subsequent combinations, so that the degradation in the error rates of control signals can be suppressed. Since the degradation in the error rated of control signals can be suppressed, the receiving quality can be improved. The known signal appended to a part immediately before the control signal contained in the second and the subsequent combinations is equivalent to part of a known signal corresponding to a data signal, the drop in transmission efficiency can be prevented. The length of a known signal appended immediately anterior to a control signal contained in the second and the subsequent combinations is equivalent to part of the length of a known signal corresponding to a data signal, so that the drop in transmission efficiency can be prevented.

By appending an additional signal to a control signal inserted between data signals, the number of subcarriers used for a data signal is made equal to the number of subcarriers used for a control signal with an additional signal. As a result thereof, the variation in signal strength can be restricted. Since the variation in signal strength can be restricted, the time constant of AGC at the receiving apparatus can be made longer. Because of this restricted and thus controlled variation in signal strength, the dynamic range at the receiving apparatus can be made smaller. Also, the receiving characteristics thereof can be improved. Since drops in signal strength in the course of a packet signal can be avoided, any transmission from a third party communication apparatus multiplexed by CSMA can be prevented. Since any transmission from a third party communication apparatus multiplexed by CSMA can be prevented, the probability of signal collisions can be lowered. Since a dummy signal is added as an additional signal, complexity of processing can be reduced. Since a receiving apparatus, once additional signals are removed from control signals with additional signals, can perform normal functions, extra processing can be reduced.

The number of subcarriers used for data signals and the number of subcarriers used for control signals with additional signals are made equal to each other by adding an additional signal to each control signal inserted between data signals before interleaving. Thus, the number of interleave size switching can be reduced. And variation in signal strength can be suppressed and controlled while reducing the number of interleave size switching. Since a signal for CRC is appended as an additional signal, the receiving characteristics can be improved.

The present invention has been described based on the embodiments. These embodiments are merely exemplary, and it is understood by those skilled in the art that various modifications to the combination of each component and process thereof are possible and that such modifications are also within the scope of the present invention.

According to the embodiments of the present invention, the adding unit 66 appends dummy signals as additional signals. The embodiment, however, is not limited thereto, and the adding unit 66 may, for instance, add signals for parity check as additional signals instead. According to this modification, the additional signals can be utilized effectively and can improve the receiving characteristics. That is, it is only required that additional signals be added whose number of subcarriers is equal to the difference between the number of subcarriers used for data signals and the number of subcarriers used for control signals.

According to the embodiments of the present invention, the adding unit 66 adds dummy signals as the additional signals. The embodiment, however, is not limited thereto, and the adding unit 66 may, for instance, append pilot signals as the additional signals instead. The pilot signals are known signals. In this modification, the adding unit 66 assigns pilot signals to subcarrriers with subcarrier numbers "–28", "–27", "27" and "28" as shown in FIG. 1. Also, the receiving apparatus uses the pilot signals in carrying out demodulation. It is to be noted that where there are already pilot signals inserted in a plurality of subcarriers with subcarrier numbers from "–26"to "26", the addition of pilot signals by the adding unit 66 is equivalent to the addition of pilot signals. According to this modification, the receiving characteristics can be improved. That is, the only requirement is such that additional signals be added whose number of subcarriers is equal to the difference between the number of subcarriers used for data signals and the number of subcarriers used for control signals.

According to the embodiments of the present invention, a signal compatible with the legacy system is appended to a leading part of a packet format. Accordingly, the adding unit 66 does not append an additional signal to the leading control signal "HT-SIG". The arrangement, however, is not limited thereto, and an arrangement may be such that the signal compatible with a legacy system is not appended to the leading part of a packet format. In such a case, the adding unit 66 may add additional signals to all of the control signals. According to this modification, the same processing is done on all of the control signals, so that the processing can be simplified. For this modification, therefore, the only requirement is such that additional signals be added whose number of subcarriers is equal to the difference between the number of subcarriers used for data signal and the number of subcarriers used for control signal.

According to the embodiments of the present invention, it is assumed that the communication system 100 is a MIMO system. The arrangement, however, is not limited thereto, and an arrangement may be such that the communication system 100 is not a MIMO system. In other words, the arrangement may be such that signals of a single stream are transmitted from a single antenna 12. According to this modification, the present invention can be applied to the various types of communication systems. That is, the only requirement is that a plurality of subcarriers are used and there is a need to control the variation in the number of subcarriers in the course of a packet signal.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus comprising:
an input unit which inputs a plurality of combinations of control signal and data signal wherein the combination uses a plurality of subcarriers;
a generation unit which generates a packet signal from the plurality of combinations inputted to said input unit in a manner that a first known signal is added to a data signal contained in a combination at the beginning among the plurality of combinations inputted to said input unit and a second known signal is added to each of the combinations other than the combination at the beginning among the plurality of combinations inputted to said input unit, in an anterior part thereof; and
a transmitter which transmits the packet signal generated by said generation unit,
wherein the second known signal is a part of the first known signal and uses the same subcarrier as used in the control signal contained respectively in the combinations other than the combination at the beginning,
the first known signal is composed of a plurality of symbols, and different subcarriers are used in different symbols,
the subcarrier used in one of the plurality of symbols forming the first known signal is identical to a subcarrier used in control signals contained in each of the combinations other than the combination at the beginning, and the subcarrier used in the other symbols forming the first known signal is different from a subcarrier used in control signals contained in each of the combinations other than the combination at the beginning, and
the second known signal is defined so as to be identical to part of the first known signal corresponding to the subcarrier used in the control signals contained in each of combinations other than the combination at the beginning.

2. A radio apparatus comprising:
an input unit which inputs a plurality of combinations of control signal and data signal wherein the combination uses a plurality of subcarriers;
a generation unit which generates a packet signal from the plurality of combinations inputted to said input unit in a manner that a first known signal is added to a data signal contained in a combination at the beginning among the plurality of combinations inputted to said input unit and a second known signal is added to each of the combinations other than the combination at the beginning among the plurality of combinations inputted to said input unit, in an anterior part thereof; and a transmitter which transmits the packet signal generated by said generation unit, wherein the second known signal is a part of the first known signal and uses the same subcarrier as used in the control signal contained respectively in the combinations other than the combination at the beginning, wherein said generation unit includes:

an interleave unit which performs interleaving of a size defined by a first number of subcarriers on control signals contained in the plurality of combinations inputted to said input unit and performs interleaving of a size defined by a second number of subcarriers on data signal in the plurality of combinations inputted to said input unit; and an adding unit which adds an additional signal to the control signals contained in the combinations other than the combination at the beginning, and wherein said adding unit adds, in symbols forming the control signals contained in the second and subsequent combinations, additional signals whose amount corresponds to a difference between the second number of subcarriers and the first number of subcarriers.

3. A radio apparatus according to claim 2, wherein the additional signal inserted by said adding unit is a dummy signal.

4. A radio apparatus according to claim 2, wherein the additional signal inserted by said adding unit is a signal for parity check.

5. A radio apparatus according to claim 2, wherein the additional signal inserted by said adding unit is a known signal.

6. A radio apparatus comprising:

an input unit which inputs a plurality of combinations of control signal and data signal wherein the combination uses a plurality of subcarriers;

a generation unit which generates a packet signal from the plurality of combinations inputted to said input unit in a manner that a first known signal is added to data signal contained in a combination at the beginning among the plurality of combinations inputted to said input unit and a second known signal is added to each of the combinations other than the combination at the beginning among the plurality of combinations inputted to said input unit, in an anterior part thereof; and a transmitter which transmits the packet signal generated by said generation unit, wherein the second known signal is a part of the first known signal and uses the same subcarrier as used in the control signal contained respectively in the combinations other than the combination at the beginning, wherein said generation unit includes:

an adding unit which adds an additional signal to control signals contained in the combinations other than the combination at the beginning among a plurality of combinations inputted by said input unit; and an interleave unit which performs interleaving of a size defined by a first number of subcarriers on control signal contained in a first combination among the plurality of combinations in which the additional signal has been added by the adding unit, and performs interleaving of a size defined by a second number of subcarriers on the remaining signals among a plurality of combinations in which the additional signal has been added by said adding unit, and wherein said adding unit adds, in symbols forming the control signals contained in the second and subsequent combinations, additional signals whose amount corresponds to a difference between the second number of subcarriers and the first number of subcarriers.

7. A radio apparatus according to claim 6, wherein the additional signal inserted by said adding unit is a signal for cyclic redundancy check (CRC).

8. A radio apparatus according to claim 6, wherein the additional signal inserted by said adding unit is a known signal.

9. A radio apparatus comprising:

a receiver which receives a plurality of combinations of control signal and data signal wherein the combination uses a plurality of subcarriers; and a demodulation unit which demodulates a packet signal from the plurality of combinations received by said receiver in a manner that while using a first known signal the demodulation is performed on a data signal contained in a combination at the beginning among the plurality of combinations received by said receiver and while using a second known signal placed in an anterior part of each of the combinations the demodulation is performed on the combinations other than the combination at the beginning among the plurality of combinations received by said receiver, wherein, in said receiver, the control signals contained respectively in the combinations other than the combination at the beginning use part of a plurality of subcarriers and the second known signal is a part of the first known signal and uses the same subcarrier as used in the control signal contained respectively in the combinations other than the combination at the beginning, wherein said demodulation unit includes:

an excluding unit which excludes an additional signal from the control signals contained in the combinations other than the combination at the beginning among the plurality of combinations received by said receiver; and a deinterleave unit which performs deinterleaving of a size defined by a first number of subcarriers on control signals contained in the plurality of combinations in which the additional signal has been excluded by said excluding unit and performs deinterleaving of a size defined by a second number of subcarriers on data signal in the plurality of combinations in which the additional signal has been excluded by said excluding unit, and wherein said excluding unit excludes additional signals, added in symbols forming the control signals contained in the second and subsequent combinations, whose amount corresponds to a difference between the second number of subcarriers and the first number of subcarriers.

10. A radio apparatus comprising:

a receiver which receives a plurality of combinations of control signal and data signal wherein the combination uses a plurality of subcarriers; and a demodulation unit which demodulates a packet signal from the plurality of combinations received by said receiver in a manner that while using a first known signal the demodulation is performed on data signal contained in a combination at the beginning among the plurality of combinations received by said receiver and while using a second known signal placed in an anterior part of each of the combinations the demodulation is performed on the combinations other than the combination at the beginning among the plurality of combinations received by said receiver, wherein, in said receiver, the control signals contained respectively in the combinations other than the combination at the beginning use part of a plurality of subcarriers and the second known signal is a part of the first known signal and uses the same subcarrier as used in the control signal contained respectively in the combinations other than the combination at the beginning, wherein said demodulation unit includes:

a deinterleave unit which performs deinterleaving of a size defined by a first number of subcarriers on control signal contained in the first combination among the plurality of combinations received by the receiver and performs deinterleaving of a size defined by a second number of subcarriers on the remaining signals in the plurality of combinations received by said receiver; and an excluding unit which excludes an additional signal from the control signals contained in the combinations other than the combination at the beginning among a plurality of combinations deinterleaved by said deinterleave unit, wherein said excluding unit excludes additional signals, added in symbols forming the control signals contained in the second and subsequent combinations, whose amount corresponds to a difference between the second number of subcarriers and the first number of subcarriers.

* * * * *